(12) United States Patent
Lehmen et al.

(10) Patent No.: US 8,214,095 B2
(45) Date of Patent: Jul. 3, 2012

(54) METHOD AND APPARATUS FOR DETECTING ENGINE FIRING IN A HYBRID POWERTRAIN SYSTEM

(75) Inventors: Allen J. Lehmen, Howell, MI (US); Kevin J. Smith, Howell, MI (US); James B. Nicholson, Albion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 472 days.

(21) Appl. No.: 12/472,484

(22) Filed: May 27, 2009

(65) Prior Publication Data

US 2010/0305800 A1 Dec. 2, 2010

(51) Int. Cl.
*G05D 3/00* (2006.01)
*G05D 1/00* (2006.01)
*B60K 6/20* (2007.10)

(52) U.S. Cl. .................. 701/22; 701/84; 180/65.21

(58) Field of Classification Search .................. 701/22, 701/35, 208, 211, 213, 300, 84; 180/65.21, 180/65.1–65.8; 340/995.1, 995.19; 903/930
See application file for complete search history.

(56) References Cited

U.S. PATENT DOCUMENTS

| | | | | |
|---|---|---|---|---|
| 5,586,432 A * | 12/1996 | Huemer et al. | | 60/274 |
| 5,653,659 A * | 8/1997 | Kunibe et al. | | 477/111 |
| 6,364,807 B1 * | 4/2002 | Koneda et al. | | 477/5 |
| 2008/0257312 A1 * | 10/2008 | Hasegawa et al. | | 123/491 |

OTHER PUBLICATIONS

U.S. Appl. No. 12/253,952, Schwenke, R. Travis.
U.S. Appl. No. 12/127,152, Miller, Jon C.

\* cited by examiner

*Primary Examiner* — James P Trammell
*Assistant Examiner* — Muhammad Shafi

(57) ABSTRACT

A method for controlling a hybrid powertrain system includes commanding engine operation to transition from an engine-off state to an engine-on state. A control scheme detects engine firing based upon input speed, input torque and a change in the input torque.

11 Claims, 2 Drawing Sheets

METHOD AND APPARATUS FOR DETECTING ENGINE FIRING IN A HYBRID POWERTRAIN SYSTEM

TECHNICAL FIELD

This disclosure pertains to control systems for powertrain systems, including hybrid powertrain systems.

BACKGROUND

The statements in this section merely provide background information related to the present disclosure and may not constitute prior art.

Vehicles use powertrain systems to generate tractive torque. Known powertrain architectures include internal combustion engines that transfer torque through a transmission to an output member. Known hybrid powertrain architectures include internal combustion engines and torque machines that transfer torque through a transmission device to an output member. The output member can be coupled to a driveline of a motor vehicle for transferring tractive torque thereto. The torque machines can include electric machines that are configured to operate as torque motors and electric power generators.

Known control systems monitor inputs from the vehicle, the powertrain and an operator and provide operational control of the powertrain, including controlling the engine state and controlling a transmission range to manage outputs of the transmission, including torque and rotational speed. Known control systems for hybrid powertrains can additionally control torque machine(s) and regulate power interchange between an energy storage device and the torque machine(s) to manage outputs of the transmission, including torque and rotational speed.

An operator operates a vehicle and powertrain by commanding a key-on state. Known control schemes for powertrain and hybrid powertrain systems include operating an engine in an engine-off state during the key-on state. The engine-off state comprises the engine unfueled and not spinning, which can occur during ongoing vehicle operation when the vehicle is in the key-on state. Known powertrain operation includes transitioning the internal combustion engine between the engine-on and engine-off states during the key-on state. Known control schemes include starting the internal combustion engine by cranking and fueling it using the powertrain system. Known engine starting events occur in response to the operator commanding a key-on state. Known engine starting events occur subsequent to an autostop command during powertrain operation in the key-on state, e.g., in response to an operator torque request.

It is known that an engine may have internal friction and pumping losses that affect engine torque, including engine torque immediately subsequent to engine start. It is known that a newly-assembled, i.e., 'green' engine can have substantial internal friction. It is known that an engine can have substantial internal friction at low ambient temperatures subsequent to a cold soak. It is known that a control scheme may not detect engine firing, i.e., may not detect the engine is producing positive torque subsequent to a start event.

SUMMARY

A powertrain system includes an internal combustion engine coupled via an input member to a hybrid transmission having a torque machine, the hybrid transmission being configured to transfer torque between the engine, the torque machine, and an output member. A method for controlling the powertrain includes commanding engine operation to transition from an engine-off state to an engine-on state, spinning the engine and subsequently fueling the engine. Input speed is monitored and an input torque from the engine to the input member is determined. Engine firing is detected when the input speed is greater than an input flare speed, when the input torque is a positive value, the input torque is increasing, and a time-rate change in the input torque exceeds a threshold, or when the input torque is greater than a threshold after a calibrated time period.

BRIEF DESCRIPTION OF THE DRAWINGS

One or more embodiments will now be described, by way of example, with reference to the accompanying drawings, in which.

DETAILED DESCRIPTION

Figure 1:
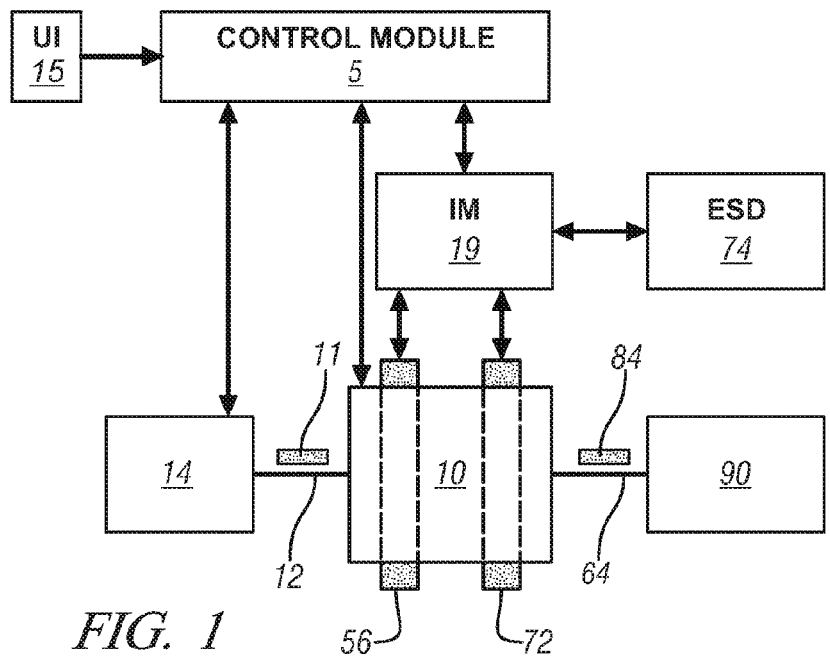
FIG. 1 is a schematic diagram of a hybrid powertrain, in accordance with the present disclosure.

Referring now to the drawings, wherein the showings are for the purpose of illustrating certain exemplary embodiments only and not for the purpose of limiting the same, FIG. 1 shows an embodiment of a hybrid powertrain system configured in accordance with the present disclosure. The exemplary hybrid powertrain system includes an internal combustion engine 14 mechanically coupled via an input member 12 to a hybrid transmission 10. The hybrid transmission 10 is configured to transfer torque between the input member 12, first and second torque machines 56 and 72, and an output member 64 coupled to a driveline 90 in response to an operator torque request and other power demands of the hybrid powertrain system. The hybrid transmission 10 selectively operates in one of a plurality of fixed gear, neutral, and continuously variable range states to transfer torque between the input member 12 and the output member 64. A power converter module (IM) 19 transforms potential energy stored in an energy storage device (ESD) 74 to power that can be used by the first and second torque machines 56 and 72 to generate mechanical torque, and transforms mechanical torque transferred through one or both the first and second torque machines 56 and 72 to potential energy that can be stored in the energy storage device 74. A control module 5 is signally and operatively connected to the engine 14, the first and second torque machines 56 and 72 and the power converter module 19. The control module 5 is preferably a general-purpose digital computer that executes algorithmic code to provide desired functions, including monitoring inputs from sensing devices and executing control and diagnostic routines to control operation of actuators using preset calibrations. A vehicle operator commands operation of the powertrain system using a plurality of interface devices, depicted herein as a user interface (UI) 15 signally connected to the control module 5. Preferred interface devices include an operator key, an accelerator pedal, a brake pedal, a transmission gear range selector and a steering wheel. The operator commands a key-on event and a key-off event using the operator key. The operator commands an operator torque request including vehicle acceleration and braking using the accelerator and brake pedals. The operator commands direction of vehicle travel using the steering wheel. The interface devices are illustrative and not restrictive.

Figure 2:
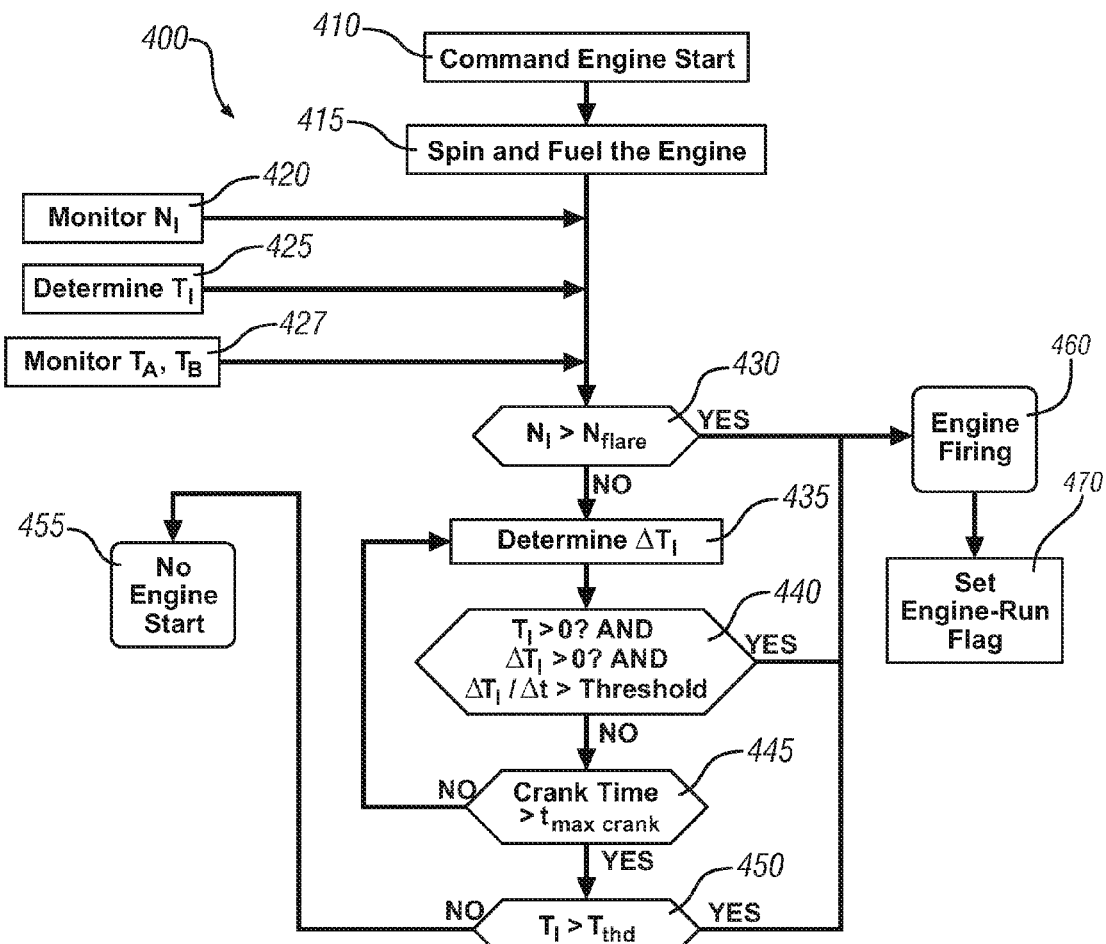
FIG. 2 is a flowchart, in accordance with the present disclosure.

FIG. 2 shows a control scheme 400 in the form of an algorithmic flowchart that is executed in the control module 5 to control operation of the exemplary hybrid powertrain system including the internal combustion engine 14 coupled via input member 12 to the hybrid transmission 10. The control scheme 400 is executed to start and run the engine 14, including detecting that the engine 14 is firing. This includes monitoring engine speed and engine torque. Detecting the engine 14 is firing may include detecting an engine flare speed event, detecting a change in engine input torque to the transmission 10, and detecting a minimum amount of engine input torque to the transmission 10. Only when all of the above detection schemes fail to indicate the engine is firing does the control scheme 400 determine that no engine start has occurred. The elements of the control scheme 400 are shown as discrete elements for ease of description. It should be appreciated that the functions described and performed by the discrete elements in the control scheme 400 may be executed using one or more devices, e.g., implemented as algorithmic code in the control module 5 using predetermined calibrations, hardware, and/or application-specific integrated circuitry (ASIC).

The control scheme commands an engine starting event with the engine 14 in the engine-off state (410). The engine starting event may include starting the engine 14 by commanding the powertrain system to transition from the engine-off state to the engine-on state, including when the operator torque request for power delivery to the driveline 90 is minimal or zero. The engine starting event can occur at an initial engine start with a transmission gear range selector (not shown) in a Park or Neutral mode when the operator executes a key-on event to command operation of the vehicle. The engine starting event can occur in response to an autostart command subsequent to an autostop command during vehicle key-on operation with the transmission gear range selector commanded in one of a Neutral mode, a Drive mode, or a Reverse mode when the vehicle is in a stopped condition during ongoing operation. One having ordinary skill in the art understands autostop or engine-off idling to be associated with, for example, key-on engine shut downs as may be implemented at traffic signal stops or during various vehicle coasting conditions. Autostarts are understood to be associated with key-on engine restarting subsequent to an autostop. The engine starting event can occur at an initial engine start in response to a key-on event at an assembly plant with a previously unfired engine. The engine starting event can occur in response to a key-on event at an initial engine start in a service bay during or subsequent to vehicle servicing. The engine starting event can include starting the engine 14 immediately subsequent to a vehicle key-on event and, alternatively, can include autostarting the engine 14 during ongoing vehicle operation subsequent to an autostop event of the engine 14 during vehicle key-on. Other operating conditions in which an engine starting event can be commanded are known to one having ordinary skill in the art.

The engine starting event ends when the engine 14 is firing and generating torque, or when it is determined that the engine 14 has failed to fire after a predetermined elapsed period of time. An engine is firing when there is sufficient power generated by combustion of fuel to overcome internal friction forces and compressive pumping losses of the engine and the engine sustains ongoing operation without supplemental power, e.g., from a torque machine.

The engine starting event includes spinning or cranking the engine 14 and then fueling and, on a spark-ignition engine system sparking the engine 14 when the engine input speed is above a predetermined speed threshold, e.g., 200 RPM (415). Spinning the engine 14 preferably comprises operating the first torque machine 56 to spin the engine 14. Fueling and sparking the engine 14 includes injecting fuel to induce engine firing. Fueling and sparking the engine 14 can include injecting fuel and executing spark ignition to induce engine firing on engines so equipped.

The input speed $N_I$ is monitored and determined using signal inputs from an engine input speed sensor 11 (420). The signal input from the input speed sensor 11 is ongoingly monitored during vehicle operation, including during engine cranking of the engine starting event. The input speed $N_I$ is periodically determined. A time-rate change in the input speed $\dot{N}_I$ is determined. Similarly, the output speed $N_O$ can be monitored and determined using signal inputs from an output speed sensor 84. A time-rate change in the output speed $\dot{N}_O$ is determined. During a key-on starting event the output speed and the time-rate change in the output speed of the output member 64 is typically zero, as the vehicle is stopped.

The control scheme 400 includes determining an input torque ($T_I$) from the engine 14 to the transmission 10 via the input member 12 (425). In one embodiment, the motor torque outputs $T_A$ and $T_B$ from the first and second torque machines 56 and 72 are concurrently monitored and determined (427). The motor torque outputs $T_A$ and $T_B$ can be determined based upon power flow from the ESD 74 to the respective one of the first and second torque machines 56 and 72. In an embodiment employing an electro-mechanical transmission system as described herein, the power flow transferred from the ESD 74 through the power converter module 19 to generate the motor torque outputs $T_A$ and $T_B$ from the first and second torque machines 56 and 72 can be determined by monitoring electric current thereto. Monitoring the input speed and input torque and monitoring the motor torque outputs preferably occurs concurrently and ongoingly during operation of the powertrain system starting with the key-on event.

The control scheme 400 includes monitoring the input speed $N_I$ to determine whether an engine flare speed event occurs, i.e., the input speed $N_I$ exceeds an input flare speed $N_{flare}$ during the engine starting event subsequent to spinning, fueling, and on spark-ignition engine systems, executing spark ignition in the engine 14 (430). When the input speed $N_I$ exceeds the input flare speed $N_{flare}$ it is determined that the engine is firing and generating torque (460) and an engine-run flag is set by the algorithm (470). During each engine starting event, engine firing events can cause the input speed $N_I$ to initially flare as the engine 14 begins to operate and generate torque, including causing the time-rate change in the input speed $\dot{N}_i$ to increase. Thus, the engine 14 is determined to be firing when the input speed from the engine 14 to the hybrid transmission 10 indicates an engine flare speed event.

The control scheme 400 ongoingly monitors and determines the magnitude of the input torque $T_I$ and a change in the input torque $\Delta T_I$ (425, 435). When the input speed $N_I$ does not exceed the input flare speed $N_{flare}$ during the engine starting event subsequent to spinning, fueling and sparking the engine 14 (430), the control scheme 400 next determines whether there is a detectable change in engine input torque to the transmission 10 within a predetermined period of time. This includes determining that the input torque is positive ($T_I > 0$), i.e., the engine 14 is generating torque, and determining that the input torque is increasing ($\Delta T_I > 0$), and determining that a time-rate change in the input torque is increasing at a rate that is greater than a threshold rate of change in the input torque ($\Delta T_I/\Delta t >$ Threshold) (440). The engine operation is monitored during the crank event, which can occur for as long as a maximum crank time ($t_{max\ crank}$) (445). When all of the aforementioned conditions are met within the maximum crank time ($t_{max\ crank}$), the control scheme determines that the engine 14 is firing and generating torque (460) and the engine-run flag is set by the algorithm (470). The maximum crank time ($t_{max\ crank}$) can be a calibrated value associated with engine operating conditions, ambient and engine temperatures, available electric power for cranking the engine 14 from the ESD 74, and other factors.

When the actual engine crank time (Crank Time) exceeds the maximum crank time ($t_{max\ crank}$) without the control scheme 400 detecting that the engine is firing (445), the control scheme 400 evaluates the absolute input torque $T_I$ to determine whether it exceeds a predetermined torque threshold ($T_I > T_{thd}$) (450). The predetermined torque threshold is a calibratable value that is greater than or equal to zero torque output. When the absolute input torque $T_I$ exceeds the predetermined torque threshold $T_{thd}$, the control scheme 400 determines that the engine is firing and generating torque (460) and an engine-run flag is set by the algorithm (470). The threshold input torque is preferably set at a threshold level that indicates the engine 14 is operating to generate a minimal amount of positive torque. In one embodiment, the threshold level is set to indicate the engine 14 is ongoingly and constantly generating 5-10 Nm of torque. When the absolute input torque $T_I$ does not exceed the predetermined torque threshold $T_{thd}$, it is determined that the engine 14 did not start and run (455).

The engine starting event and subsequent monitoring to detect engine firing is executed for the maximum crank time ($t_{max\ crank}$), which is preferably a predetermined period of time (445). In a condition whereat engine firing is not indicated as described herein after the maximum crank time ($t_{max\ crank}$), a fault related to an engine no-start event is identified. The command to execute the engine starting event is discontinued, including the control scheme 400 preferably acting to discontinue fueling and sparking the engine 14. The control scheme 400 may elect to continue operating the vehicle using the torque machines 56 and 72 to provide tractive torque and subsequently execute the control scheme 400 to retry starting the engine 14. The control scheme 400 may elect to discontinue powertrain operation.

In one embodiment, the control scheme 400 determines the magnitude of the input torque $T_I$ (425) and determines the change in the input torque $\Delta T_I$ from the engine 14 (435) by solving a torque transfer relationship executed as an element of an output and motor torque control scheme. One exemplary output and motor torque control scheme includes a torque transfer relationship between the input member 12, the first and second torque machines 56 and 72, and the output member 64 to motor torque commands $T_A$ and $T_B$ for the first and second torque machines 56 and 72. The control scheme includes executable code to determine the motor torque commands $T_A$ and $T_B$ for the first and second torque machines 56 and 72 responsive to inputs comprising the input speed $N_I$, the output speed $N_O$, a commanded output torque $T_O$, and clutch torque(s) of applied torque transfer clutches (not shown), if any, related to a present transmission range state.

When an operator commands the transmission 10 to operate in Neutral or Park, e.g., via input to the transmission gear range selector of the user interface 15, the torque transfer relationship between the input member 12, the first and second torque machines 56 and 72, and the output member 64 can be described mathematically as follows:

$$\begin{bmatrix} T_A \\ T_B \\ T_O \end{bmatrix} = \begin{bmatrix} a11 & a12 & a13 & a14 \\ a21 & a22 & a23 & a24 \\ a31 & a32 & a33 & a34 \end{bmatrix} \begin{bmatrix} T_I \\ \dot{N}_I \\ \dot{N}_O \\ \dot{N}_{C1} \end{bmatrix} \quad [1]$$

wherein $\dot{N}_I$ is the time-rate change in the input speed $N_I$ of the input member 12;
$\dot{N}_O$ is the time-rate change in the output speed $N_O$ of the output member 64; and
$\dot{N}_{Ci}$ is a time-rate change in a clutch slip speed $N_{C1}$ of a torque transfer clutch C1 (not shown) which can be determined based upon the input speed $N_I$ and the output speed $N_O$.

The elements of the 3×4 matrix (a11-a34) are known scalar parametric values determined based upon hardware gear and shaft interconnections corresponding to the specific configuration of the transmission 10 when operating in Neutral.

When the transmission 10 is operating in one of the continuously variable mode range states, the torque transfer relationship between the input member 12, the first and second torque machines 56 and 72, and the output member 64 can described mathematically as follows:

$$\begin{bmatrix} T_A \\ T_B \end{bmatrix} = \begin{bmatrix} c11 & c12 & c13 & c14 \\ c21 & c22 & c23 & c24 \\ c31 & c32 & c33 & c34 \end{bmatrix} \begin{bmatrix} T_I \\ T_O \\ \dot{N}_I \\ N_O \end{bmatrix} \quad [2]$$

wherein the elements of the 3×4 matrix (c11-c34) are parametric values determined based upon hardware gear and shaft interconnections corresponding to the specific configuration of the transmission 10 when operating in the continuously variable mode.

Eqs. 1 and 2 are each reduced to algorithmic code in the control module 5 and executed as elements of the output and motor torque control scheme. During each engine starting event, the motor torque outputs $T_A$ and $T_B$, the time-rate change in the input speed $\dot{N}_I$, the time-rate change in the output speed $\dot{N}_O$, the time-rate change in the clutch slip speed of clutch C1, $\dot{N}_{Ci}$ and the output torque $T_O$ can all be measured or inferred from a measurement. Therefore, the engine input torque $T_I$ can be periodically calculated using one of Eq. 1 or 2. The periodically calculated engine input torque $T_I$ can be used to calculate the time-rate change in the engine input torque $T_I$, i.e., $\Delta T_I/\Delta t$. Alternatively, engine input torque $T_I$ can be determined by directly monitoring engine input torque, engine airflow, and other engine operating parameters.

Figure 3:
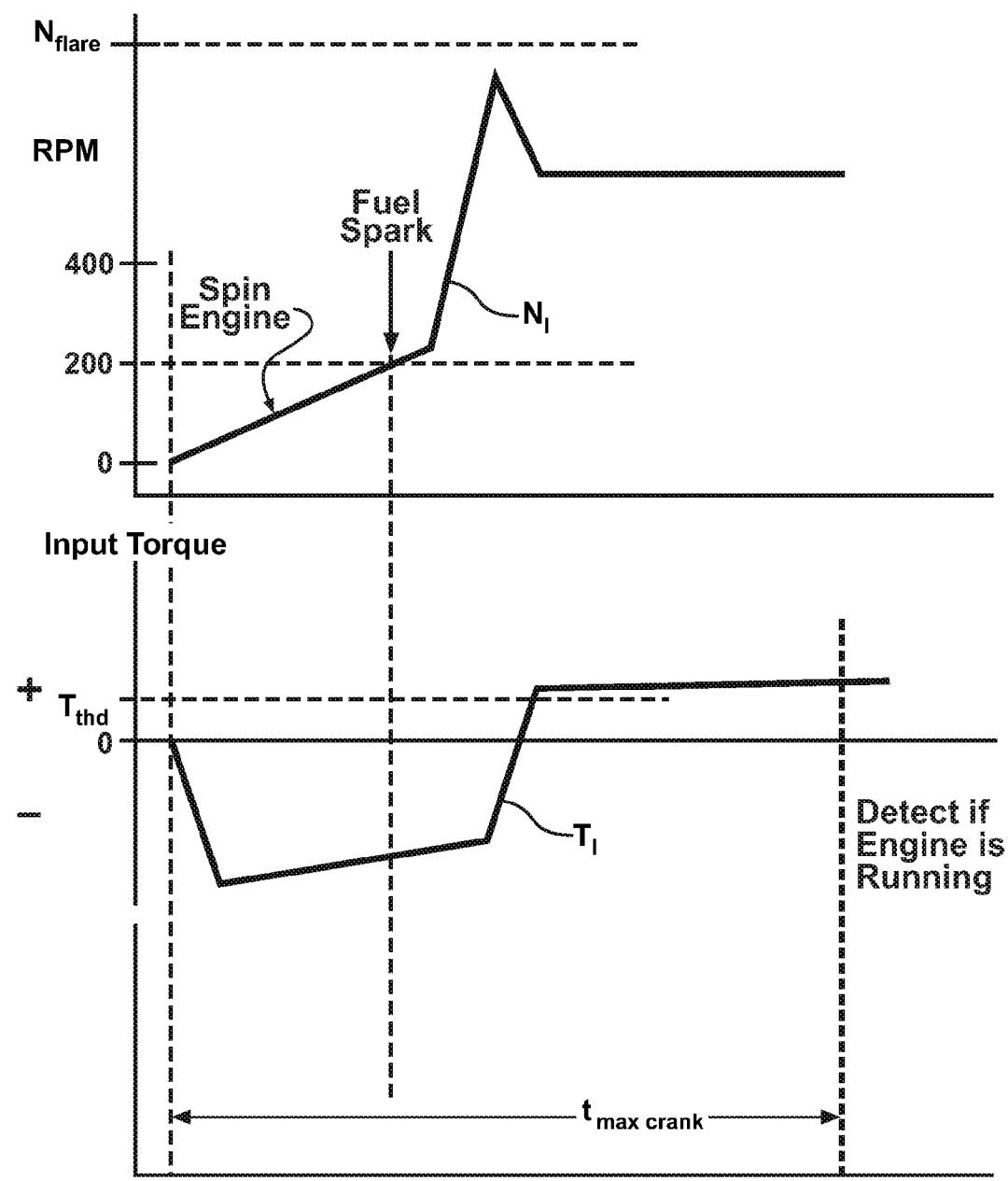
FIG. 3 is a datagraph, in accordance with the present disclosure.

FIG. 3 graphically shows input speed ($N_I$) and input torque ($T_I$) over elapsed time during an engine cranking event for an exemplary powertrain system using the control scheme 400 described with reference to FIG. 2. The engine 14 initially spins from zero speed (Spin Engine) with a corresponding negative input torque. When the engine speed reaches a predetermined threshold, e.g., 200 RPM, the control scheme 400 implements fuel and ignition control (Fuel/Spark) to attempt to fire and start the engine 14. The input speed $N_I$ can flare at that point, but may not achieve a threshold input flare speed $N_{flare}$, as is shown. The control scheme 400 continues to spin and fire the engine 14 until the crank time exceeds the maximum crank time ($t_{max\ crank}$). So long as the absolute input torque $T_I$ exceeds the predetermined torque threshold $T_{thd}$ after the maximum crank time, the control scheme 400 detects that the engine 14 is running.

The embodiment of FIG. 1 shows first and second torque machines 56 and 72, but the control scheme 400 can be executed in various powertrain systems including hybrid and non-hybrid powertrain systems. This includes a hybrid powertrain employing a single torque machine that is operative to spin the engine and a hybrid powertrain employing multiple torque machines wherein one of the torque machines is operative to spin the engine. The control scheme 400 can be executed in powertrain systems employing non-electric torque machines wherein one of the torque machines is operative to spin the engine. The control scheme 400 can be executed in a non-hybrid powertrain system equipped with a starter motor to spin the engine.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. A method for controlling a powertrain system including an internal combustion engine coupled via an input member to a hybrid transmission including a torque machine, the hybrid transmission configured to transfer torque between the engine, the torque machine, and an output member, wherein a microprocessor performs the following steps:
   commanding engine operation to transition from an engine-off state to an engine-on state;
   spinning the engine and subsequently fueling the engine;
   monitoring an input speed and determining an input torque from the engine to the input member;
   performing a first engine firing diagnostic comprising detecting the engine is firing when the input speed is greater than an input flare speed;
   performing a second engine firing diagnostic comprising detecting the engine is firing when the input torque is a positive value, the input torque is increasing, and a time-rate change in the input torque exceeds a threshold;
   performing a third engine firing diagnostic comprising detecting the engine is firing when the input torque is greater than a threshold after a calibrated time period, and performing the first engine firing diagnostic and subsequently performing the second engine firing diagnostic only when performance of the first engine firing diagnostic does not detect the engine is firing, and subsequently performing the third engine firing diagnostic only when performance of the second engine firing diagnostic does not detect the engine is firing.

2. The method of claim 1, wherein commanding the engine operation to transition from the engine-off state to the engine-on state comprises an engine autostart.

3. The method of claim 1, further comprising sparking the engine subsequent to spinning the engine.

4. The method of claim 1, comprising monitoring a torque output from the torque machine to the hybrid transmission, and determining a magnitude of the input torque from the engine to the hybrid transmission corresponding to the torque output from the torque machine.

5. A method for controlling a powertrain system including an internal combustion engine coupled to a hybrid transmission including a torque machine, the hybrid transmission configured to transfer torque between the engine, the torque machine, and an output member, wherein a microprocessor performs the following steps:
   commanding an engine starting event;
   spinning the engine and then fueling the engine;
   monitoring an input speed and determining an input torque from the engine to the hybrid transmission; and
   determining that the engine did not start and run only when the input speed fails to exceed an input flare speed, and the input torque is less than a threshold after a calibrated time period.

6. The method of claim 5, further comprising discontinuing the engine starting event when it is determined that the engine did not start and run.

7. A method for controlling a powertrain system including an internal combustion engine coupled to a hybrid transmission including first and second torque machines, the hybrid transmission configured to transfer torque between the engine, the first and second torque machines and an output member, wherein a microprocessor performs the following steps:
   commanding engine operation to transition from an engine-off state to an engine-on state;
   spinning the engine and then fueling the engine;
   monitoring an input speed and determining an input torque from the engine to the hybrid transmission;
   providing a first engine firing diagnostic configured to detect the engine is firing when the input speed is greater than an input flare speed;
   providing a second engine firing diagnostic configured to detect the engine is firing when the input torque is a positive value, the input torque is increasing, and a time-rate change in the input torque exceeds a threshold;
   providing a third engine firing diagnostic configured to detect the engine is firing when the input torque is greater than a threshold after a calibrated time period; and
   performing the first engine firing diagnostic and subsequently performing the second engine firing diagnostic only when performance of the first engine firing diagnostic does not detect the engine is firing and subsequently performing the third engine firing diagnostic only when performance of the second engine firing diagnostic does not detect the engine is firing.

8. The method of claim 7, wherein determining an input torque from the engine to the hybrid transmission comprises:
   monitoring the input speed and an output speed of the output member;
   determining motor torques transferred between the first and second torque machines and the transmission; and
   calculating the input torque associated with time-rate changes in the rotational speeds of the input member and the output member and the motor torques transferred between the first and second torque machines and the transmission.

9. The method of claim 7, wherein commanding the engine operation to transition from the engine-off state to the engine-on state comprises an engine autostart.

10. The method of claim 7, further comprising sparking the engine subsequent to spinning the engine.

11. The method of claim 7, further comprising discontinuing the engine starting event when it is determined that the engine did not start and run.

* * * * *